United States Patent
Tyler

(10) Patent No.: US 6,883,320 B2
(45) Date of Patent: Apr. 26, 2005

(54) CONTROL SYSTEM REGULATING AIR FLOW TO ENGINE INTAKE

(75) Inventor: Jeffrey A. Tyler, Newark, NY (US)

(73) Assignee: G. W. Lisk Company, Inc., Clifton Springs, NY (US)

( * ) Notice: Subject to any disclaimer, the term of this patent is extended or adjusted under 35 U.S.C. 154(b) by 0 days.

(21) Appl. No.: 10/615,129

(22) Filed: Jul. 8, 2003

(65) Prior Publication Data

US 2005/0005919 A1 Jan. 13, 2005

(51) Int. Cl.[7] .......................... F02D 23/00; F15B 13/16; F16K 31/12
(52) U.S. Cl. ........................... 60/602; 123/564; 91/387; 251/58; 251/30.01
(58) Field of Search .......................... 60/602; 123/563, 123/564; 91/387, 382, 377; 251/58, 30.01

(56) References Cited

U.S. PATENT DOCUMENTS

| | | | |
|---|---|---|---|
| 3,450,109 A | | 6/1969 | Gratzmuller |
| 3,797,364 A | * | 3/1974 | Schulze ........................ 91/382 |
| 3,872,772 A | * | 3/1975 | Walters ........................ 91/387 |
| 3,954,045 A | * | 5/1976 | Barlow ........................ 91/387 |
| 3,988,894 A | | 11/1976 | Melchior |
| 4,201,116 A | * | 5/1980 | Martin ........................ 91/387 |
| 4,373,336 A | | 2/1983 | Horler et al. |
| 4,493,336 A | * | 1/1985 | Renfro ........................ 251/58 |
| 4,502,283 A | | 3/1985 | Wandel |
| 4,556,192 A | * | 12/1985 | Ramisch ........................ 251/58 |
| 4,738,110 A | | 4/1988 | Tateno ........................ 60/610 |
| 5,079,921 A | * | 1/1992 | McCandless et al. ......... 60/602 |
| 5,152,144 A | | 10/1992 | Andrie |
| 5,350,152 A | * | 9/1994 | Hutchison et al. ............ 91/387 |
| 5,355,677 A | | 10/1994 | Hawkins et al. ............. 60/609 |
| 5,617,726 A | | 4/1997 | Sheridan et al. |
| 5,649,516 A | | 7/1997 | Laveran ..................... 123/563 |
| 5,724,813 A | | 3/1998 | Fenelon et al. |
| 5,911,212 A | | 6/1999 | Benson ....................... 123/563 |
| 6,138,617 A | | 10/2000 | Kuze |
| 6,170,514 B1 | * | 1/2001 | Esmailzadeh ................ 251/58 |
| 6,293,262 B1 | | 9/2001 | Craig et al. ................. 123/543 |
| 6,408,831 B1 | | 6/2002 | Craig et al. ................. 123/542 |
| 6,474,318 B1 | | 11/2002 | Jones et al. ................. 123/564 |
| 6,510,690 B2 | | 1/2003 | Furukawa et al. |
| 6,601,821 B2 | * | 8/2003 | Tyler .......................... 91/387 |
| 2002/0007816 A1 | | 1/2002 | Zur Loye et al. |
| 2002/0069859 A1 | * | 6/2002 | Hasegawa et al. .......... 123/563 |
| 2002/0073977 A1 | | 6/2002 | Craig et al. |
| 2002/0146606 A1 | | 10/2002 | Kobayashi et al. |

FOREIGN PATENT DOCUMENTS

| | | | | |
|---|---|---|---|---|
| DE | 3627686 A1 | * | 11/1987 | ................. 123/563 |
| JP | 404060115 A | | 2/1992 | ................. 123/563 |

* cited by examiner

*Primary Examiner*—Thai-Ba Trieu
(74) *Attorney, Agent, or Firm*—Brown & Michaels, PC

(57) ABSTRACT

A servomechanism for a valve controlling engine intake flow via a cooler and a bypass uses a proportional solenoid operating a hydraulic valve to power a hydraulic actuator setting the position of the control valve. An engine sensor and electric controller provide input to the proportional solenoid, and feedback from the position of the control valve is applied to the hydraulic valve by a cam and spring applying a force in opposition to the proportional solenoid.

21 Claims, 5 Drawing Sheets

CONTROL SYSTEM REGULATING AIR FLOW TO ENGINE INTAKE

TECHNICAL FIELD

Controlling engine intake via cooler and cooler bypass

BACKGROUND

Some internal combustion engines use intake coolers and cooler bypasses through which intake flow is controlled to maximize engine performance and minimize engine emissions. Valving of the intake passages through the cooler and the bypass controls intake flow rates for this purpose. One goal of such intake flow control is adjusting temperature of the engine intake to accommodate engine operating temperature. For example, intake valving can feed a warmer intake to a cold diesel engine that has recently started, and as the engine warms up from operating, the valving can feed the engine a cooler and denser intake.

The beneficial results of a well controlled engine intake flow adjusted between a cooler and a bypass are generally understood, but shortfalls in the application of such controls still exist. For example, existing intake control systems suffer from inaccuracy, cumbersomeness, and expense.

The aim of this invention is to significantly improve the accuracy of intake flow control valving to better optimize engine performance. The invention seeks to accomplish this while keeping an intake valve control system compact, reliable, and affordable.

SUMMARY

The inventive way of controlling intake flow to an engine via a cooler and a bypass uses a hydraulic actuator for a control valve regulating the intake flow. A proportional solenoid operates the hydraulic actuator by positioning a hydraulic valve in a circuit to the actuator. To ensure accuracy and reliability, a position of the intake control valve is fed back to the hydraulic valve in opposition to the solenoid. A preferred way of accomplishing this is to use a spring compressed between something moveable with the control valve and the hydraulic valve that is positioned by the proportional solenoid. The device moveable with the control valve can be a cam arranged on the control valve stem, or a piston of the hydraulic actuator.

A sensor monitoring an engine condition such as temperature communicates with an electric control that powers the proportional solenoid. When the sensor detects a change in the monitored engine condition calling for a change in the intake control valve, the electric control alters the power to the proportional solenoid. This moves the hydraulic valve that is positioned by the solenoid, which in turn adjusts the hydraulic actuator to move the intake control valve. This movement of the hydraulic actuator piston or the cam associated with the control valve then changes the force transmitted by the spring back to the hydraulic valve in opposition to the solenoid to achieve a null position. This holds the control valve in place until the sensed engine condition requires a further change.

In practice, two or more control valves can be interconnected and involved in regulating intake flow through the cooler and the cooler bypass. The sensed engine condition can include temperature and other parameters; a microprocessor can interpret the sensor signals and power the proportional solenoid accordingly; and the null condition for a fully warmed up and steadily operating engine can be a powerless, or rest position of the proportional solenoid. The invention advantageously accommodates these and many other variations to optimize engine performance.

Using a proportional solenoid to infinitely adjust a hydraulic valve gives the servo system sensitivity and infinite variability; using hydraulic power fed to an actuator by the hydraulic valve amplifies the force available from the proportional solenoid and extends the range of movement for physically adjusting intake control valving; and feedback of control valve position to the hydraulic valve as a force countering the proportional solenoid achieves accuracy in setting the control valving precisely as required by sensed engine conditions. The complete servomechanism to accomplish this can also be packaged compactly and affordably in an engine environment. Hydraulic power can be drawn from an engine's oil pump or associated hydraulic pump, and the resulting arrangement significantly improves on prior art attempts at intake control.

DRAWINGS

DETAILED DESCRIPTION

Figure 1:
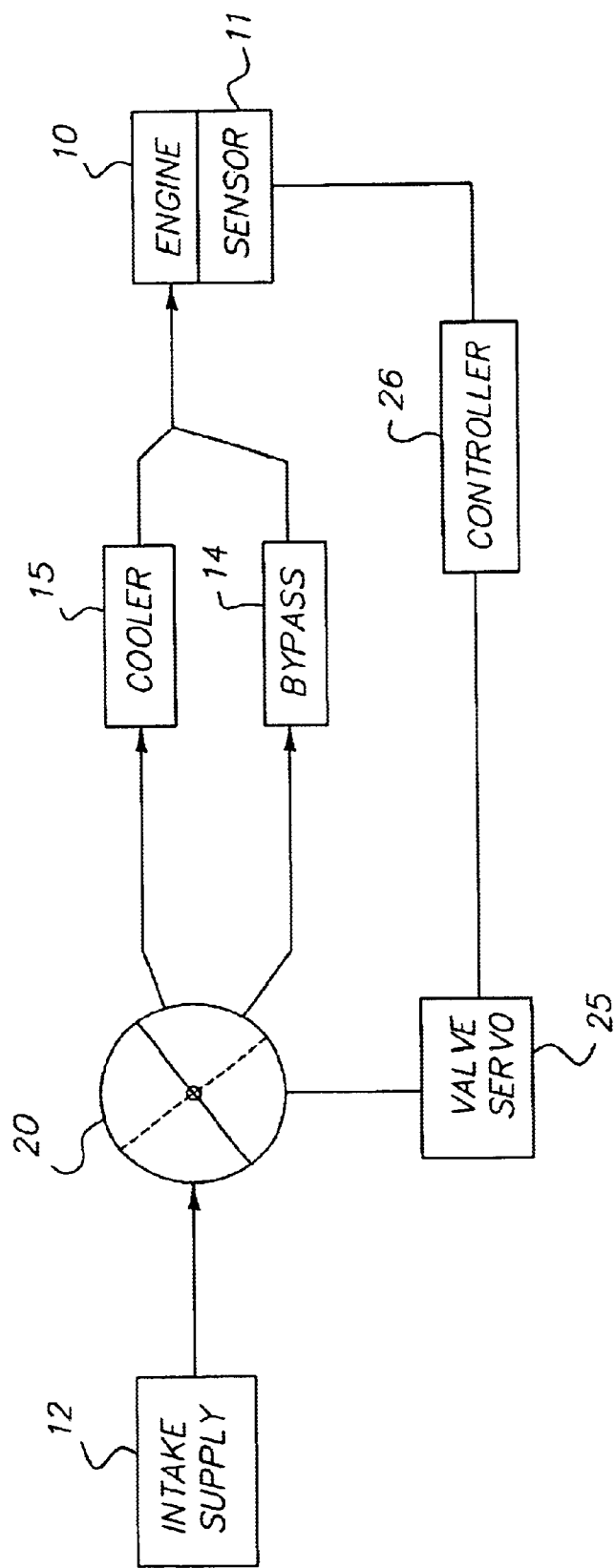
FIG. 1 is a schematic diagram showing the inventive intake control valve arranged to adjust engine intake flow through a cooler and a bypass.

The schematic of FIG. 1 illustrates the environment in which the invention occurs. This includes an internal combustion engine 10 and a sensor 11 sensing an engine condition. Engine 10 is often a diesel engine, but the invention is not limited to compression ignition engines. Sensor 11 senses a temperature of engine 10, and can also sense other engine parameters such as RPM, load, intake temperature and pressure, exhaust temperature and pressure, fuel intake rate, and possibly other parameters.

An intake supply 12 for engine 10 often includes a turbo charger or super charger of intake air, and can also include exhaust gas recirculation and anything else intentionally fed to engine 10 as part of its oxygen intake. When supply 12 includes a turbo charger or super charger, the compressed air that results is heated, which reduces its density at a given pressure. When engine 10 is running at its optimum temperature, it can benefit from having its intake supply cooled by cooler 15, but in some circumstances, and especially when engine 10 is running at less than its optimum temperature, bypass 14 provides an intake route around cooler 15 to give engine 10 a warmer intake.

To control or regulate a temperature of intake flow reaching engine 10 under different circumstances, an intake control valve 20 adjusts flow rates through cooler 15 and bypass 14. Setting valve 20 in different positions can alter the proportion of intake flow passing through cooler 15 and bypass 14 to give engine 10 an optimized inflow, depending on the temperature and other operating parameters of engine 10. The desired setting of valve 20 to achieve an intake flow that best meets the need of engine 10 is within the knowledge of engine designers, and this invention offers a way of positioning valve to accurately meet those needs in a wide range of operating circumstances.

Valve servo 25 adjusts the position of control valve 20, and accomplishes this in response to electric controller 26, which receives a signal from sensor 11. Controller 26 can be a simple electric controller directly responsive to a single temperature sensor 11, or can be a more complex microprocessor receiving signals from a team of sensors 11 monitoring several engine operating conditions. The invention thus accommodates different levels of sophistication in the precision with which engine intake flow is regulated.

Figure 2:
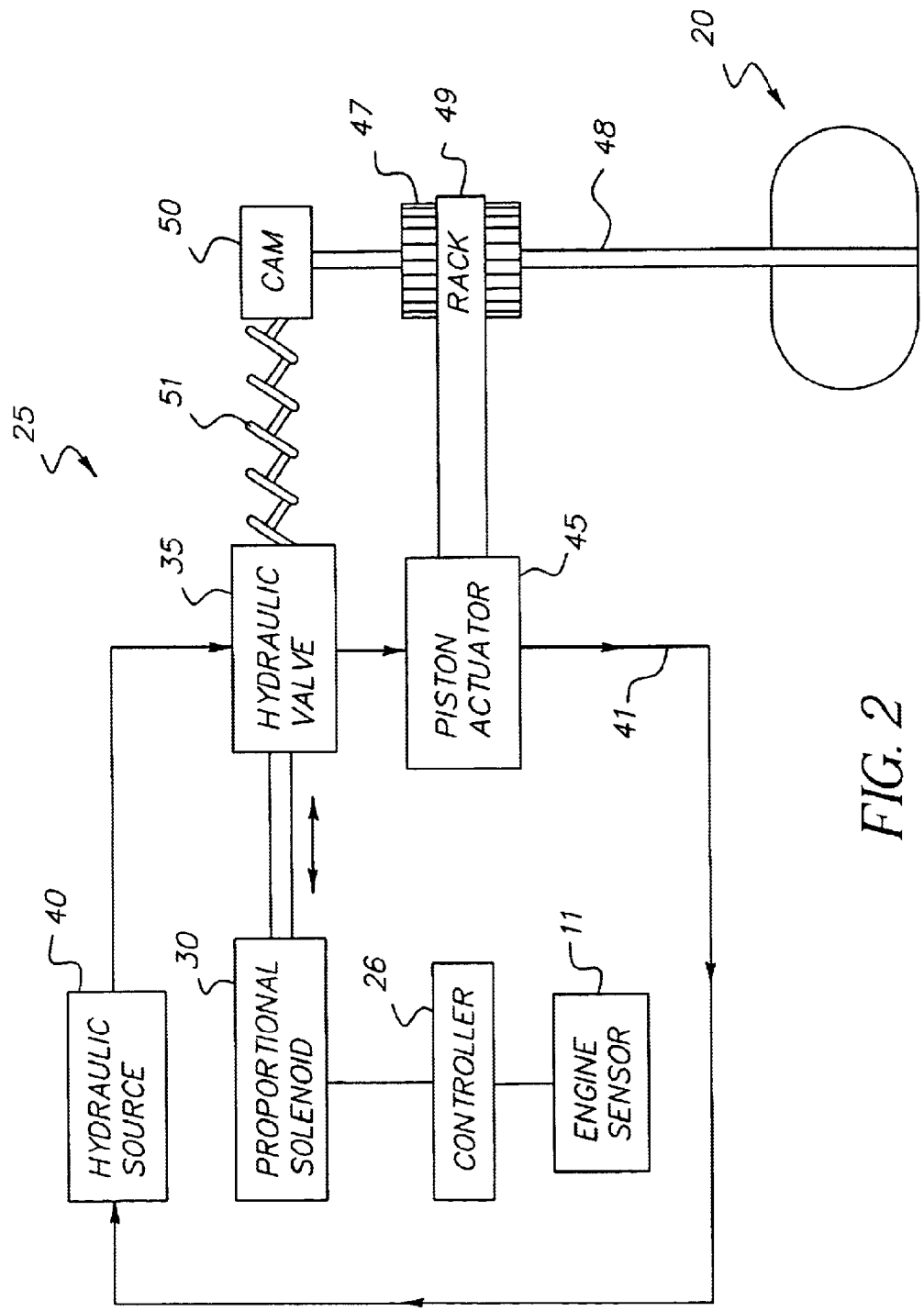
FIG. 2 is a schematic diagram of the inventive servomechanism arranged to set a position of an intake control valve.

More details of valve servo 25 are shown schematically in FIG. 2 where servo components are arranged to position intake control valve 20. A proportional solenoid 30 accomplishes this with the aid of a hydraulic source 40 powering a hydraulic circuit 41. Proportional solenoid 30 adjusts a hydraulic valve 35 that determines the hydraulic flow to an actuator 45. Small movements of hydraulic valve 35 powered by a relatively small force from proportional solenoid 30 are used to hydraulically drive actuator 45 more forcefully through a larger range of movement to position control valve 20. Hydraulic source 40 can be an engine oil pump or a hydraulic pump driven by an engine. Hydraulic valve 35 is preferably a spool valve axially positioned by proportional solenoid 30; and hydraulic actuator 45 is preferably a cylinder and piston arranged to move a rack 46 meshed with a pinion 47 on a rotational shaft 48 of a control valve 20 that preferably has the form of a butterfly valve 20.

A cam 50 is preferably also mounted on shaft 48 so that a rotational position of cam 50 corresponds with a rotational position of butterfly valve 20. Preferably a simple compression spring 51 can then feed back to spool valve 35 a force representing a position of control valve 20. The fed back force applied by compression spring 51 opposes forces applied by proportional solenoid 30. Such a feedback arrangement preferably provides a force balanced null at any of an infinite variety of control valve positions corresponding to power inputs to proportional solenoid 30 from controller 26 responding to one or more sensors 11. When such a null occurs, spool valve 35 is positioned to block hydraulic flow in circuit 41 and hold valve 20 in a set position.

Figure 3:
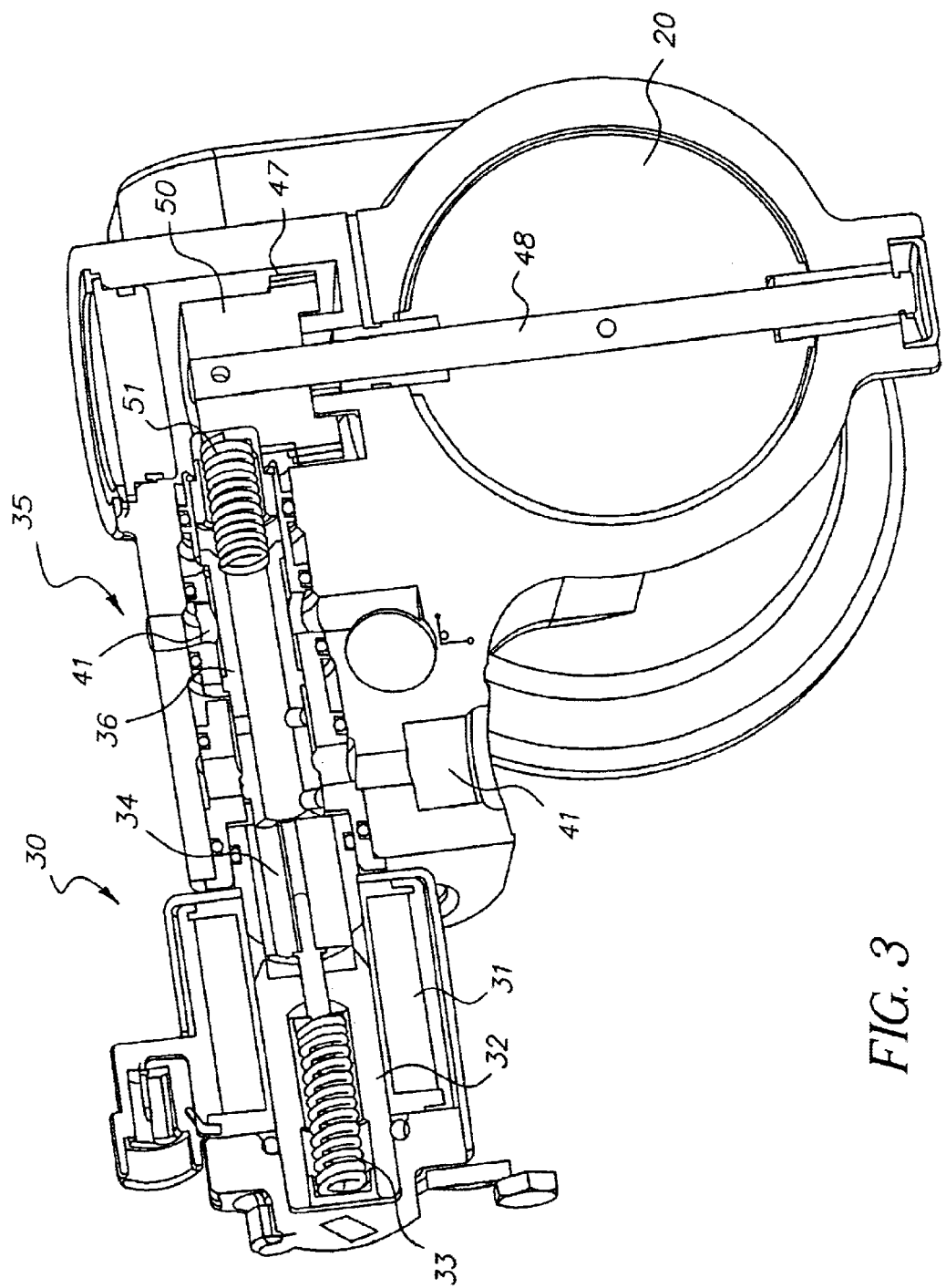
FIG. 3 is a partially cut away view of a preferred embodiment of the servomechanism schematically illustrated in FIG. 2.
Figure 4:
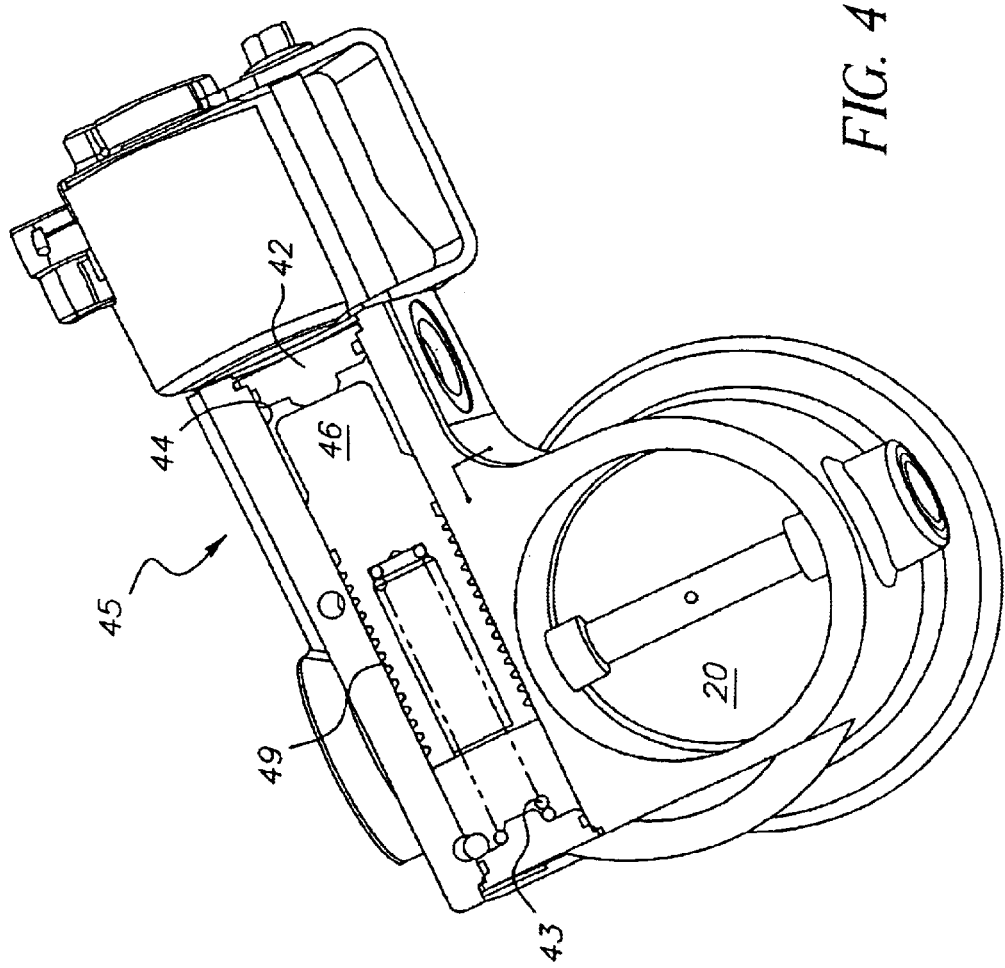
FIG. 4 is a partially cut away view of a preferred hydraulic actuator arranged to position an intake control valve.

FIGS. 3 and 4 show many preferred details of the components for servomechanism 25 that are-schematically illustrated in FIG. 2. Proportional solenoid 30 is shown in FIG. 3 as including solenoid coil 31, stationary pole 32, axially moveable element or armature 34, and a null or bias spring 33. Movement of armature 34 in response to magnetic force-produced by coil 31 also moves spool 36 of hydraulic valve 35. Spool 36 is sealed and ported to control flow through hydraulic circuit 41 to and from piston 46 of actuator 45 shown in FIG. 4. Rack 49, which is formed as part of piston 46 moves against return spring 43 and meshes with pinion 47, shown in FIG. 3.

Feedback cam 50 mounted on shaft 48 along with pinion 47 engages feedback spring 51, which is compressed between cam 50 and hydraulic valve spool 36. Hydraulic cylinder 44, which is capped by plug 42 and which houses piston 46, is arranged in hydraulic circuit 41 from spool valve 35 so that piston 46 moves rack 49 back and forth in response to movement of valve spool 36. This occurs whenever solenoid coil 31 receives a change in power input to move armature 34, which changes an axial position of valve spool 36. Any such movement of valve spool 36 allows fluid in circuit 41 to move into or out of cylinder 44, and this allows piston 46 to move in the indicated direction. Such movements of spool 36, piston 46, rack 49 pinion 47, and butterfly valve 20 stops when a feedback force from cam 50 and spring 51 counter balance the force of solenoid coil 31 and null spring 33 to bring the system to a null position. When such a null occurs, valve spool 36 is positioned to block any flow in or out of cylinder 44, which consequently holds butterfly valve 20 in a fixed position. Any further change in the power supplied to solenoid coil 31 accomplishes a similar train of movements leading to another null position holding intake control valve 20 in a new position.

Figure 5:
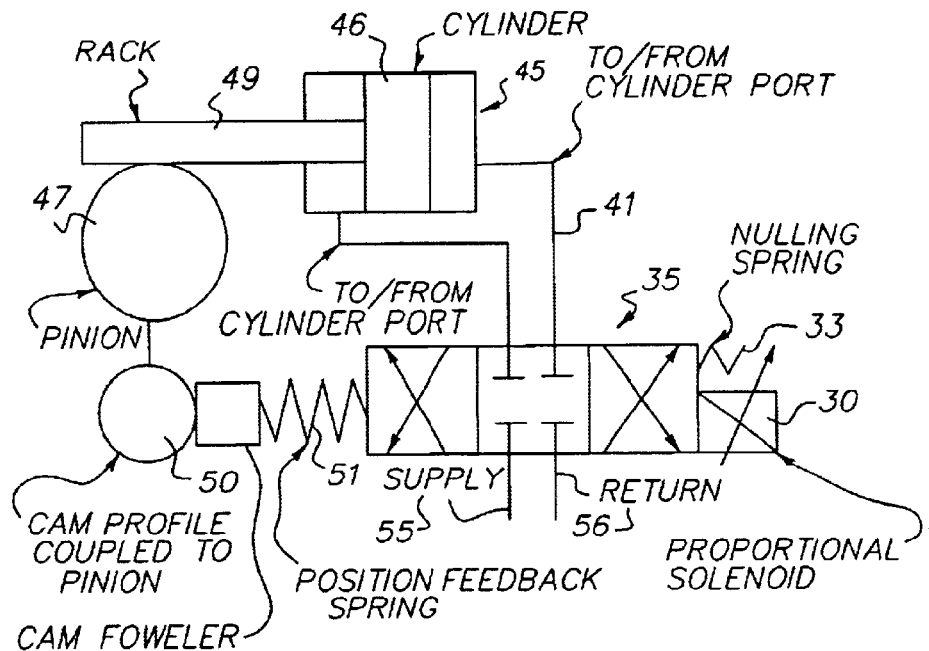
FIG. 5 is a schematic hydraulic diagram of the servomechanism of FIGS. 2–4.

FIG. 5 schematically illustrates the hydraulic flow of the servomechanism illustrated in FIGS. 3 and 4. Hydraulic valve 35 controls hydraulic flow in circuit 41 from a supply 55 and to a return 56. The hydraulic flow to and from piston 46 of actuator 45 moves rack 49, pinion 47, and feedback cam 50. Feedback spring 51 then applies the feedback force from cam 50 to hydraulic valve 35.

There are many ways that the preferred details illustrated in FIGS. 3 and 4 can be changed. More than one butterfly valve can be involved in valving intake flow to an engine. For example, two or more butterfly valves can be linked together by sharing rotational axis, or by gearing, so that a position of each valve involved can be fed back via a single cam 50. A hydraulic actuator 45 can use mechanisms other than the preferred rack 49 and pinion 47. Also, solenoid 30 can be arranged to operate a hydraulic valve other than spool valve 35.

Feedback can also be accomplished by something other than compression spring 51. The preferred arrangement, however, allows proportional solenoid 30, hydraulic valve 35, actuator 45, and butterfly valve 20 all to be arranged in a singe housing that includes feedback cam 50 and spring 51. This packaging of components facilitates compactness and affordability.

Figure 6:
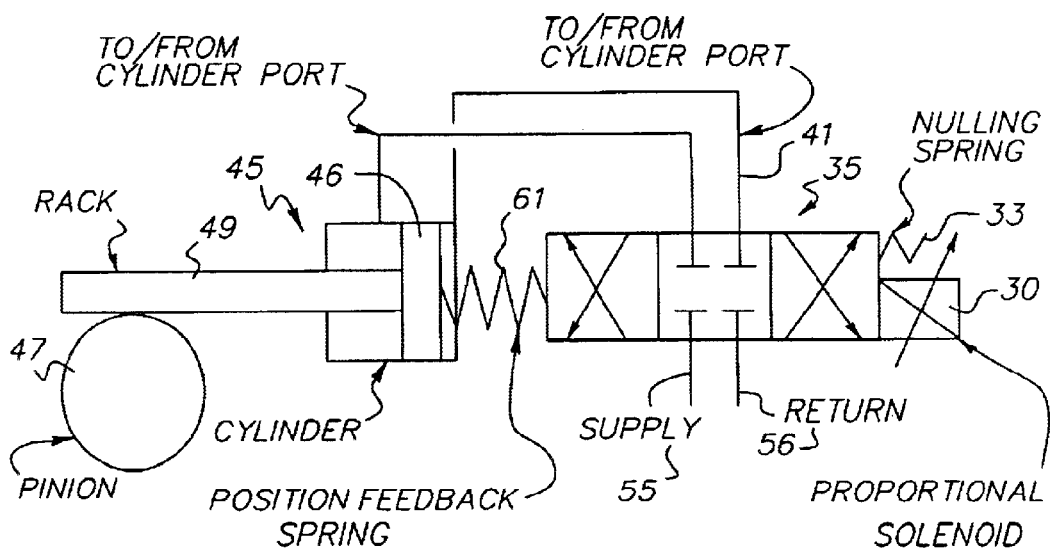
FIG. 6 is a schematic hydraulic diagram of another preferred servomechanism using many of the components of FIGS. 2–4.

Another way that the preferred details illustrated in FIGS. 3 and 4 can be changed is to modify the way the feedback spring force is generated. This alternative preferred possibility is shown in the hydraulic schematic circuit of FIG. 6 where feedback spring 61 is compressed between piston 46 of actuator 45 and hydraulic valve 35. An axial position of piston 46 reliably corresponds with a position of air control valve 20 controlled by pinion 47 and rack 49, so that a feedback force via spring 61 can reliably be derived from a position of piston 46. Such an arrangement can also help keep the packaging of the servomechanism compact. The hydraulic passages between valve and actuator 45 can be conveniently arranged in a housing that also includes feedback spring 61 arranged between piston 46 and a spool of valve 35.

I claim:

1. A method of regulating a valved intake flow through a cooler and a cooler bypass to an engine intake, the method comprising:
   a. using a hydraulically powered actuator to change the valved flow;
   b. adjusting the hydraulic actuator with a spool valve positioned by a proportional solenoid to infinitely adjust the valved flow;

c. controlling the proportional solenoid in response to a sensor of engine temperature;
d. arranging a spring to move with changes in the valved flow;
e. transmitting a feedback force to the spool valve via the spring; and
f. responding to a change of current to the proportional solenoid caused by a change in engine temperature detected by the sensor by moving the spool valve to change flow of hydraulic fluid to the hydraulic actuator to adjust the valved flow and change the feedback transmitted by the spring to the spool valve.

2. The method of claim 1 including sensing engine conditions other than temperature and using a microprocessor to control the proportional solenoid in response to the sensed conditions.

3. The method of claim 1 including compressing the spring between the hydraulic actuator and the spool valve.

4. The method of claim 1 including compressing the spring between the spool valve and a cam that moves with changes in the valved flow.

5. A servomechanism operating a control valve regulating flow to an engine intake via a cooler and a bypass, the servomechanism comprising:
   a. a hydraulic actuator for the control valve;
   b. the hydraulic actuator being operated by a proportional solenoid positioning a hydraulic valve in a circuit to the actuator;
   c. position of the control valve being fed back as a variable force applied to the hydraulic valve in opposition to the solenoid; and
   d. a cam moving with the control valve and a spring arranged between the cam and the hydraulic valve to feed back the variable force.

6. The servomechanism of claim 5 including a sensor of an engine condition and a controller in communication with the sensor arranged to control the proportional solenoid.

7. The servomechanism of claim 5 wherein the spring is compressed between the hydraulic actuator and the hydraulic valve to feed back the variable force.

8. A servomechanism arranged to regulate at least one control valve directing intake to a diesel engine via a cooler and a bypass of the cooler, the servomechanism comprising;
   a. a hydraulic actuator arranged to position the control valve;
   b. a hydraulic circuit arranged to deliver hydraulic fluid to the actuator;
   c. an engine sensor detecting a condition of the engine;
   d. an electronic controller in communication with the sensor;
   e. a proportional solenoid powered by the electronic controller in response to the sensor;
   f. a hydraulic spool valve positioned by an armature of the proportional solenoid, the spool valve being arranged in the hydraulic circuit to the actuator; and
   g. a compression spring arranged to feed back to the spool valve a spring force representing control valve position and opposing the armature of the solenoid, whereby the control valve is infinitely variable in response to the engine sensor, and wherein a change of current to the proportional solenoid in response to a change in an engine condition detected by the sensor moves the spool valve to change flow of hydraulic fluid to the hydraulic actuator, adjusts the control valve, and chances the feedback transmitted to the stool valve via the compression spring.

9. The servomechanism of claim 8 wherein the electronic controller is a microprocessor, and including a plurality of engine sensors detecting a corresponding plurality of engine conditions, the plurality of sensors being in communication with the microprocessor.

10. The servomechanism of claim 8 wherein the spring is arranged between the spool valve and a cam moveable with the control valve to represent a position of the control valve.

11. The servomechanism of claim 8 wherein the spring is arranged between the spool valve and the hydraulic actuator to represent a position of the control valve.

12. A system controlling flow to an engine intake via a control valve arranged to vary flow rates in passageways leading through a cooler and a cooler bypass, the system comprising:
   a. a hydraulic actuator arranged to adjust the control valve to vary the flow rates;
   b. a proportional solenoid operating a spool valve in a hydraulic circuit to the actuator so that the spool valve of the proportional solenoid adjusts hydraulic flow to the actuator;
   c. an electronic control having an input from a sensor of an engine condition and having an output of current to the proportional solenoid; and
   d. a mechanical coupling arranged to feed position of the control valve back to the spool valve in opposition to the proportional solenoid wherein a chance of current to the proportional solenoid in response to a change in an engine condition detected by the sensor moves the spool valve to change flow of hydraulic fluid to the actuator, adjusts the control valve, and changes the feedback via the mechanical coupling.

13. The system of claim 12 wherein the control valve is adjustable throughout a range of positions controlled by the proportional solenoid via mechanical coupling feedback.

14. The system of claim 12 wherein the electronic control is a microprocessor, and including a plurality of sensors of different engine conditions resulting in adjustment of the control valve as a function of the sensed engine conditions.

15. The system of claim 12 wherein the mechanical coupling comprises a cam moved with the control valve and a spring following the cam and engaging the spool valve.

16. The system of claim 12 wherein the mechanical coupling is a spring compressed between the hydraulic actuator and the spool valve.

17. A system regulating temperature of charged inlet air to an engine, the system including a supercharger or turbo charger, an intercooler, an intercooler bypass, and a sensor of engine temperature, and the system comprising:
   a. at least one air valve arranged to vary a rate of cooled air flow reaching the engine via the intercooler and to vary a rate of uncooled air flow reaching the engine via the bypass;
   b. a hydraulic actuator arranged to position the air valve to affect the temperature of the air flow reaching the engine intake in response to engine temperature detected by the sensor;
   c. a circuit powering the hydraulic actuator being controlled by a spool valve moved by a proportional solenoid receiving electrical input from a controller in communication with the sensor; and
   d. a mechanical feedback transmitting air valve position to the spool valve via a spring opposing force applied to the spool valve by the solenoid, wherein a change in engine temperature changes the electrical input from the controller to the proportional solenoid, which moves the spool valve and the hydraulic actuator to change the position of the air valve to a position in which the mechanical feedback transmitted to the spool valve counterbalances the force applied to the spool valve by the proportional solenoid.

18. The temperature regulating system of claim 17 wherein the mechanical feedback includes a cam that moves with the air valve.

19. The temperature regulating system of claim 17 wherein the controller is in communication with another sensor of an engine condition other than temperature.

20. The temperature regulating system of claim 17 wherein the mechanical feedback includes a cam moveable with the air valve, and a spring engaging the cam and the spool valve.

21. The temperature regulating system of claim 17 wherein the mechanical feedback comprises a spring compressed between the hydraulic actuator and the spool valve.

* * * * *